United States Patent Office 2,726,143
Patented Dec. 6, 1955

2,726,143

PROCESS FOR THE REDUCTION OF ALKALI METAL SULFATES

Joseph R. Mares, Dickinson, Tex., assignor to Monsanto Chemical Company, St. Louis, Mo., a corporation of Delaware No Drawing. Application August 27, 1952, Serial No. 306,729

5 Claims. (Cl. 23—177)

This invention relates to an improved process for the reduction of alkali metal sulfates. More specifically this invention relates to an improved process for the reduction of alkali metal sulfates using elemental phosphorus as the reducing agent.

Large quantities of anhydrous sodium sulfate, or saltcake as it is more familiarly called, are made commercially available as the by-product from several industrial manufacturing processes. Since Glauber first reduced sodium sulfate by heating it with charcoal in 1658, a number of processes have been developed and patented for reducing this sulfate employing coal, hydrogen, carbon monoxide and steam, compounds of iron, etc. In none of the prior art, however, has there been any attempt to utilize the reducing power of elemental phosphorus in the reduction of alkali metal sulfates.

The prior art also discloses a series of processes for the production of phosphate salts by reduction of the corresponding sulfates in phosphoric acid employing carbonaceous material, such as coke, as the reducing agent. In such processes, the carbon or coke is usually not completely oxidized and the phosphate salt badly colored. In these processes, therefore, it is necessary to burn out the unreacted carbon or coke or to purify the product by dissolving it in water and filtering off the insoluble impurities. Obviously such processes leave much to be desired.

It is an object of this invention to provide a new process for the reduction of alkali metal sulfates.

It is another object of this invention to provide a process for the production of sulfur dioxide.

It is a further object of this invention to provide a process for the concomitant production of sulfur dioxide and alkali metal phosphate salts by the reduction of alkali metal sulfates with elemental phosphorus.

Further objects will become apparent from the description of the novel process of this invention.

It has now been discovered that if an alkali metal sulfate is reacted with elemental phosphorus in the presence of phosphoric acid, a sulfur-containing reaction product of predominantly sulfur dioxide is produced together with a phosphate salt mixture of neutral, mono and dibasic alkali metal phosphates. According to this invention, therefore, a mixture comprising elemental phosphorus, an alkali metal sulfate and phosphoric acid is reacted at an elevated temperature in a suitable reactor, producing sulfur dioxide and a mixture of alkali metal phosphate salts.

In the actual practice of the novel process of this invention, phosphoric acid is charged to a suitable reaction vessel fitted with a stirrer, a thermowell, and an off-gas outlet. The reactor is connected to a feed hopper with a special sealed valve arrangement designed to permit feeding the phosphorus-alkali metal sulfate mixture at desired intervals without loss of product $SO_2$. The acid is heated to a temperature above about 200° C. and the phosphorus-alkali metal sulfate mixture is then added incrementally with sufficient agitation to provide thorough mixing of the reactants. The elevated temperature is maintained throughout the addition and in the subsequent reaction period when the reaction is allowed to continue until there is no further evolution of gas or until all the phosphorus is consumed in the reaction. The sulfur dioxide is withdrawn through the off-gas outlet as it is formed. The mixture of phosphate salts and any residual unreacted sodium sulfate, clear and water white in color, crystallizes on cooling and may be purified by the usual techniques, if desired.

The invention is illustrated, but not limited by the following specific example.

Example 1

A 500-ml., three-necked, round-bottomed flask fitted with a mercury-seal stirrer, a thermowell and off-gas outlet, and a dropping funnel was employed as a reactor. The dropping funnel was equipped with a special ground-glass valve and was closed at the top with a ground-glass seal to prevent any loss of product gas during feeding of the reactants. A surge flask to which a manometer was attached and a caustic scrubber were connected to the off-gas outlet.

Anhydrous phosphoric acid (80 g.) was charged to the reactor and heated to 300° C. An intimate mixture of red phosphorus (6.2 g.) and sodium sulfate (71 g.) was then added in increments from the dropping funnel allowing time for reaction between additions. The temperature was maintained at 300–335° C. and the reactants were kept thoroughly agitated throughout the reaction period. After addition of the phosphorus-sulfate mixture was complete, the reaction was continued until all the phosphorus was consumed, or until there was no further evolution of gas. Total reaction time was about three hours.

The off-gas was scrubbed in 5% sodium hydroxide. An aliquot of the scrubber solution was oxidized with 30% hydrogen peroxide, acidified with concentrated nitric acid and reacted with barium chloride to precipitate the sulfate which was weighed. The yield of $SO_2$, back-calculated from the sulfate values obtained, was 70%. The mixture of neutral, mono and dibasic sodium phosphate salts which crystallized on cooling the reaction mixture was clear and water-white.

The preceding example sets forth a specific embodiment of this invention. The reactants and reaction conditions specified therein are subject to substantial variation without departing from the scope of this invention. For example, any alkali metal sulfate such as sodium, potassium or lithium sulfate can be used in this process. Similarly, any of the various forms of elemental phosphorus such as red or yellow can be utilized. Repeating the procedure previously described using potassium sulfate in place of sodium sulfate and yellow phosphorus in place of red phosphorus results in a substantial yield of sulfur dioxide and potassium phosphate salts.

The phosphate salt mixture obtained is not contaminated with highly colored impurities. The phosphate salt can be separated from any residual sulfate by conventional precipitation techniques well known to those skilled in the art. The phosphate salt mixture obtained is a mixture of neutral, mono and dibasic alkali metal phosphate salts.

The preceding example illustrates one of the procedures that can be used in carrying out the novel process of this invention. However, substantial variation in the procedural aspects of this invention is also possible. U. S. Patents 2,142,943 and 2,142,944 describe a process for the production of phosphates by the reaction of sodium chloride, phosphorus pentoxide and water. In this process elemental phosphorus is completely burned in air to $P_2O_5$ which is then introduced into a reaction zone containing sodium chloride and steam. The novel process of this invention can be carried out in a furnace similar to those described in the aforementioned patents modifying it to the extent that an alkali metal sulfate is used in place of sodium chloride and the process operated with a deficiency of air so that a mixture of $P_2O_5$ and elemental phosphorus passes to the primary reaction zone. This latter zone will then contain a mixture of an alkali metal sulfate, elemental phosphorus and phosphoric acid, formed by the reaction of steam with $P_2O_5$, which mixture then reacts in accordance with this invention.

The novel process of this invention can be carried out over a wide range of elevated temperatures. Temperatures above about 200° C. are preferred with the maximum applicable temperature being governed principally by the equipment used and the procedural aspects of the process. Very high combustion temperatures can be used if desired.

The reaction can be carried out either in the presence or absence of water, although initially substantially anhydrous conditions are preferred. Some water is formed in the reaction. Best yields of sulfur dioxide are obtained when the reactants used are initially substantially anhydrous as the initial presence of water in the reactants promotes the formation of some free sulfur either through the reaction of phosphorus with sulfur dioxide or through the formation of $H_2S$ which reacts with sulfur dioxide to form sulfur.

The quantities of reactants used in this process are also subject to substantial variation. Generally, reactants in the ratio of from about 1 mol of the sulfate salt and phosphoric acid to about 5 mols of the sulfate salt and phosphoric acid per mol of phosphorus are applicable in the novel process of this invention. Any of the various forms of phosphoric acid can be utilized in this process. For example, metaphosphoric acid and pyrophosphoric acid can be used to replace the orthophosphoric acid in the process as described in Example 1.

What is claimed is:
1. A process for the reduction of alkali metal sulfates to produce sulfur dioxide which comprises reacting at a temperature above about 200° C. an initially substantially anhydrous mixture comprising an alkali metal sulfate, elemental phosphorus and phosphoric acid.
2. The process as described in claim 1 wherein the alkali metal sulfate is sodium sulfate.
3. A process for the reduction of alkali metal sulfates to produce sulfur dioxide which comprises reacting at a temperature above about 200° C. an initially substantially anhydrous mixture comprising an alkali metal sulfate, elemental phosphorus and phosphoric acid in the ratio of from about 1 to about 5 mols each of the alkali metal sulfate and phosphoric acid per mol of elemental phosphorus.
4. A process for the reduction of alkali metal sulfates to produce sulfur dioxide which comprises reacting at a temperature above about 200° C. an initially substantially anhydrous mixture comprising an alkali metal sulfate, elemental phosphorus and phosphoric acid in the ratio of from about 1 to about 5 mols each of the alkali metal sulfate and phosphoric acid per mol of elemental phosphorus, and recovering therefrom sulfur dioxide and alkali metal phosphate salts.
5. The process as described in claim 4 wherein the alkali metal sulfate is sodium sulfate.

References Cited in the file of this patent
UNITED STATES PATENTS

| | | |
|---|---|---|
| 1,903,582 | Conway | Apr. 11, 1933 |
| 2,107,857 | Emmett | Feb. 8, 1938 |
| 2,142,943 | Kerschbaum | Jan. 3, 1939 |
| 2,142,944 | Kerschbaum | Jan. 3, 1939 |
| 2,222,740 | Bornemann | Nov. 26, 1940 |
| 2,232,099 | Jahn | Feb. 18, 1941 |
| 2,374,188 | Frear | Apr. 24, 1945 |

FOREIGN PATENTS

| | | |
|---|---|---|
| 247 | Great Britain | of A. D. 1876 |
| 3,761 | Great Britain | of A. D. 1885 |

OTHER REFERENCES

Smith's: "Inorganic Chemistry" by Kendall, pages 552–553, Appleton Century Co., N. Y., 1937.
Mellor: "Comprehensive Treatise on Inorganic and Theoretical Chemistry," vol. 8, pages 786, 787, Longmans, Green and Co., New York, 1928.